United States Patent
Vishwakarma et al.

(10) Patent No.: US 11,915,160 B2
(45) Date of Patent: Feb. 27, 2024

(54) SYSTEM AND METHOD FOR PROBABILISTICALLY FORECASTING HEALTH OF HARDWARE IN A LARGE-SCALE SYSTEM

(71) Applicant: EMC IP Holding Company LLC, Hopkinton, MA (US)

(72) Inventors: Rahul Deo Vishwakarma, Bengaluru (IN); Jitendra Singh, Bengaluru (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 389 days.

(21) Appl. No.: 16/923,007

(22) Filed: Jul. 7, 2020

(65) Prior Publication Data

US 2021/0365821 A1   Nov. 25, 2021

(30) Foreign Application Priority Data

May 19, 2020 (IN) .............................. 202041021001

(51) Int. Cl.
*G06N 7/01* (2023.01)
*G06N 20/00* (2019.01)

(52) U.S. Cl.
CPC .............. *G06N 7/01* (2023.01); *G06N 20/00* (2019.01)

(58) Field of Classification Search
CPC ............. G06F 9/45558; G06F 18/2415; G06F 11/004; G06N 5/022; G06N 7/01; G06Q 10/06315
See application file for complete search history.

(56) References Cited

U.S. PATENT DOCUMENTS

| | | | |
|---|---|---|---|
| 2007/0183625 A1* | 8/2007 | Dussich | G06V 40/10 382/100 |
| 2015/0067410 A1* | 3/2015 | Kumar | G06F 11/004 714/47.3 |
| 2015/0186172 A1* | 7/2015 | Thomas | G06F 8/61 718/1 |
| 2018/0053097 A1* | 2/2018 | Soni | G06N 20/00 |
| 2018/0053104 A1* | 2/2018 | Teplinsky | G06F 11/3428 |
| 2018/0218277 A1* | 8/2018 | Korsedal | G06N 7/01 |
| 2019/0138964 A1* | 5/2019 | Morita | G06Q 10/06315 |

* cited by examiner

*Primary Examiner* — Saba Dagnew
(74) *Attorney, Agent, or Firm* — Chamberlain, Hrdlicka, White, Williams & Aughtry; Aly Z. Dossa (57) ABSTRACT

Embodiments described herein relate to a method for probabilistically forecasting the state of hardware components. The method may include obtaining data items corresponding to a hardware component and performing an analysis of the hardware component. The analysis may include making a variety of probability predictions as to whether a label from among a set of possible labels is likely to be the correct label. The set of probabilities from the aforementioned analysis are then analyzed to determine which predicted label has the tightest range, and the prediction with the tightest range for a certain label is displayed to a user in a ranked fashion that includes a quantity of such probability prediction ranges. Such a display may allow an administrator to take action as to which hardware components should be replaced and in what order.

16 Claims, 6 Drawing Sheets

SYSTEM AND METHOD FOR PROBABILISTICALLY FORECASTING HEALTH OF HARDWARE IN A LARGE-SCALE SYSTEM

BACKGROUND

Computing devices often store data on one or more storage devices included in and/or operatively connected to the computing device. Computing devices may also include a variety of other hardware components. Such hardware components may fail, or be close to failing, from time to time. Such potential failures may require replacement of various hardware components.

SUMMARY

In general, embodiments described herein relate to a method for probabilistically forecasting the state of hardware components. The method may include obtaining a plurality of data items corresponding to a hardware component and performing an analysis of the hardware component. The analysis may include making a first prediction that the hardware component to be associated with a first label; performing, based on the first prediction and using the plurality of data items and the first label, a first comparison of the hardware component to a plurality of other hardware components previously predicted to have the first label to obtain a first percentage of matches; performing, based on the first prediction and using the plurality of data items and the first label, a second comparison of the hardware component to a second plurality of other hardware components previously predicted to have a second label to obtain a second percentage of matches; making a second prediction the hardware component to be associated with a second label; performing, based on the second prediction and using the plurality of data items and the second label, a third comparison of the hardware component to the plurality of other hardware components previously predicted to have the first label to obtain a third percentage of matches; and performing, based on the second prediction and using the plurality of data items and the second label, a fourth comparison of the hardware component to the second plurality of other hardware components previously predicted to have the second label to obtain a second percentage of matches. The method may also include generating a results matrix based on the first percentage of matches, the second percentage of matches, the third percentage of matches, and the fourth percentage of matches. Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for probabilistically forecasting the state of hardware components of computing devices. Computing devices may include a variety of hardware components (e.g., hard disk drives (HDDs), solid state drives (SSDs). Storage Class Memory (SCM), networking components (e.g., network cards), batteries, processors, memory components, etc.). Such components may fail from time to time. It is often possible to determine, based on an assessment of the hardware components whether a hardware component has already failed. In one or more embodiments, it is also possible to assess a variety of data items related to a hardware component to determine that it is operating in a normal state, and thus likely not to fail within a certain time window, or that the hardware component may be likely to fail within said time window (e.g., five days), which, for example, may mean that the data items associated with the hardware component are similar to the data items associated with hardware components that previously failed within the time window.

In one or more embodiments, any machine learning algorithm may be provided a training data set that includes any number of data items associated with hardware components. Such a training data set may be used for the machine learning algorithm to predict a label (e.g., failed, normal, degraded and soon to fail, etc.) to be associated with a given hardware component. Such a prediction may be made, for example, by calculating a score based on the data items, and comparing the score to one or more threshold scores, with the outcome of the comparison(s) determining the label associated with a given hardware component.

In one or more embodiments, using enough information from the training data set, the machine learning algorithm advances its ability to correctly predict which label should be associated with a given hardware component.

However, in one or more embodiments, the prediction may or not be correct, and the machine learning algorithm, does not provide any additional insight as to how likely the assigned label is to being correct. Therefore, in one or more embodiments, additional analysis is performed to provide additional information that provides insight into the likelihood that the prediction is correct. Specifically, one or more embodiments described herein perform an additional analysis that includes comparisons of the prediction with sets of data that include previous predictions that a hardware component should have each of the labels in the label set. Such comparisons may be used to determine probabilities indicating how similar the current prediction is to the set of previous predictions using the data items associated with the current hardware component and the set of hardware components for which a label was predicted.

In one or more embodiments, such additional analysis to determine a set of probabilities may be referred to as a probability analysis. One example of such a probability analysis is a Venn-Aber prediction framework. Other probability classification schemes may be used without departing from the scope of embodiments described herein. In one or more embodiments, the probability analysis makes separate predictions that a given hardware component should be assigned each label in a label set (e.g., predict failed, then predict normal). Next, for each prediction, the information associated with the hardware components is compared with the set of previously predicted hardware component labels.

For example, a label of failed for a hardware component is predicted out of a set of labels including failed and normal. Next, the prediction is compared with a set of hardware components of the same type previously predicted to be failed, and a probability is assigned based on the comparison. Next, the prediction is compared to the set of hardware component predictions previously made that the label should be normal, and a probability is assigned based on the comparison. Next, a label of normal is predicted out of a set of labels including failed and normal. Next, the prediction is compared with a set of hardware components of the same type previously predicted to be failed, and a probability is assigned based on the comparison. Next, the prediction is compared to the set of hardware component predictions previously made that the label should be normal, and a probability is assigned based on the comparison. In one or more embodiments, the four probabilities are arranged in a matrix that includes a column for each predicted label (e.g., failed, normal), and the probability results are used to populate the rows.

Next, each column (e.g., each predicted label) is assessed to determine the numerical difference between the highest and lowest value therein. In one or more embodiments, the column having the smallest numerical difference value represents the more likely correct label. In one or more embodiments, this type analysis is repeated for any number of hardware components of a given type (e.g., SSD, HDD, etc.) in, for example, a data center.

In one or more embodiments, once a set of data on hardware components is created with the likely correct labels, the aggregate set can be assessed to determine a ranking of the hardware components to determine which has the highest probability of failure from among the set of hardware components of a given type. For example, a set of SSDs so analyzed may be ranked, in order of the tightness of the probability range for the label selected during the aforementioned analysis.

In one or more embodiments, once the ranking has occurred, the results may be displayed or otherwise provided to an entity that can take appropriate action(s) using the information. For example, the top ten most likely SSDs to fail in the next five days (based on the tightness of the probability distribution of the accuracy of the predicted label) may be displayed for viewing by an administrator of the data center. Such a display may allow the administrator to make improved decisions regarding which SSDs to replace, and/or when, based on the displayed listing that includes the probability ranges.

Figure 1:
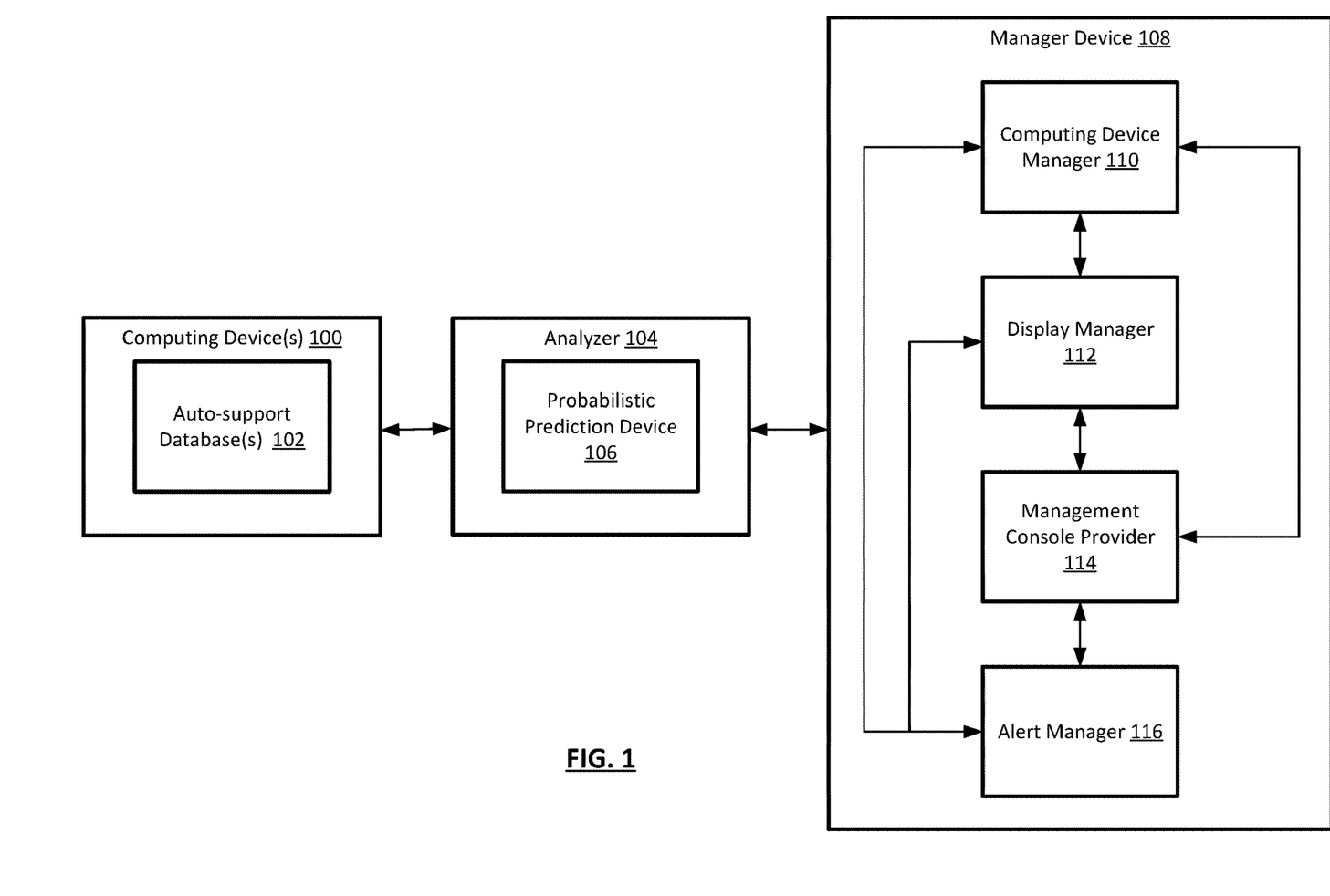
FIG. 1 shows a diagram of a system in accordance with one or more embodiments of the invention.

FIG. 1 shows a diagram of a system in accordance with one or more embodiments described herein. The system may include any number of computing devices (100), each of which may include an auto support database (102). The system may also include an analyzer (104). In one or more embodiments, the analyzer includes a probabilistic prediction device (106). The system may also include a manager device (108). In one or more embodiments, the manager device includes a computing device manager (110), a display manager (112), a management console provider (114), and an alert manager (116). Each of these components is described below.

In one or more embodiments, a computing device (100) is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention. In one or more embodiments, a set of computing device (100) may form all or a portion of a data domain. In one or more embodiments, a data domain is any set of computing devices (100) for which backup services are performed, such as, for example, data backup, disaster recovery, backup [data deduplication, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a computing device (100) includes an auto-support database (102) stored in any storage accessible by the computing device. In one or more embodiments, the auto-support data-base (102) is a set of data items stored in any format, with portions of the set of data items being associated with different hardware components of the computing device (100). For example, an auto-support database entry for a particular SSD may include information relating to read errors, seek errors, power on information, power cycle information, reallocation event information, command timeout information, sector information, etc. The potential information in a given entry for a disk drive is not limited to the aforementioned examples, and any other type of information may be associated in an auto-support database (102) with other types of hardware components.

In one or more embodiments, a computing device (100) is operatively connected to an analyzer (104). In one or more embodiments, an analyzer (104) is also a computing device.

In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, an analyzer (104) includes functionality to perform a predictive analysis using any machine learning algorithm Additionally, or alternatively, an analyzer (104) may be provided the results of such a predictive analysis from any other component of the system (e.g., a computing device (100)). In one or more embodiments, the predictive analysis, as described above, provides a prediction relating to what label should be associated with a given hardware component In one or more embodiments, an analyzer (104) includes a probabilistic prediction device (106). In one or more embodiments, a probabilistic prediction device (106) is any hardware (e.g., circuitry), software, firmware, or any combination thereof that includes functionality to perform an analysis to yield a set of probabilities representing one or more probabilistic prediction ranges for one or more hardware components. For example, a probabilistic prediction device (106) may be one or more processes executing on one or more processors of one or more computing devices.

In one or more embodiments, a probabilistic prediction device (106) includes functionality to obtain data items associated with any number of hardware components of any number of computing devices (100). In one or more embodiments, probabilistic prediction device (106) further includes functionality to use the obtained data items to analyze the data items for a given hardware component against a set of previous predictions to determine a probability range that each label in a set of labels is correct, and to provide the results of such analyses to a manager device (108) (discussed below). In one or more embodiments, the analyzer (104) performs the probabilistic prediction using the existence of a network connection to the computing devices (100), with each new set of data items for a given hardware component being analyzed by the probabilistic prediction device (106) using an existing data set of previous predictions for hardware components of the same type as the hardware component being so analyzed.

In one or more embodiments, the analyzer (104) is operatively connected to a manager device (108). In one or more embodiments, the manager device (108) is also a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a manager device (108) is a computing device that includes a variety of components used for managing, at least in part, a data domain (e.g., a set of computing devices (100)).

In one or more embodiments, the manager device (108) includes a computing device manager (110). In one or more embodiments, a computing device manager (110) is any hardware (e.g., circuitry), software, firmware, or any combination thereof that includes functionality to manage, at least in part, a data domain that includes computing devices (100). For example, a computing device manager (110) may be one or more processes executing on one or more processors of one or more computing devices.

In one or more embodiments, a computing device manager (110) includes functionality to obtain information from one or more analyzers (104). In one or more embodiments, such information may include the results produced by a probabilistic prediction device (106) of an analyzer (104). In one or more embodiments, such results may include probability ranges for possible labels that might be assigned to various hardware components. In such embodiments, the computing device manager (110) may include functionality to assess the results to determine which are the most likely labels, and to arrange them in a ranking of which label predictions are most likely to be accurate based on the tightness of the range of the probabilities for a set of labels for each hardware component of a given type in a data domain. For example, a computing device manager (110) may determine a set of hardware components of a given type for which a prediction of a failed or soon-to-fail label was probabilistically more likely, and rank said components based on the numerical difference between the highest and lowest probability, with the tightest such range being ranked the highest, and the rest ranked in a descending order of range tightness. In other embodiments of the invention, the aforementioned analysis may be performed by the analyzer (104), with the results and rankings being provided to the computing device manager (110) by the analyzer (104).

In one or more embodiments, the manager device (108) includes a display manager (112). In one or more embodiments, a display manager (112) is any hardware (e.g., circuitry), software, firmware, or any combination thereof that includes functionality to manage, at least in part, the display (e.g., via a graphical user interface) of data related a data domain that includes computing devices (100), and which may be provided to the display manager (112) from a computing device manager (110). For example, a display manager (112) may be one or more processes executing on one or more processors of one or more computing devices (e.g., manager device (108)). In one or more embodiments, the display manager (112) is operatively connected to one or more of the computing device manager (110), the management console provider (114) (discussed below), and the alert manager (116) (discussed below). As an example, a display manager (112) may be configured to display a ranking of the top twenty HDDs in a data domain (e.g., a Dell EMC Data Domain) that may fail within the next ten days, with the ranking being based on the tightness of the probability range associated with the predicted fail label output by a machine learning predictive analysis of HDDs in the data domain (e.g., a Dell EMC Data Domain).

In one or more embodiments, the manager device (108) includes a management console provider (114). In one or more embodiments, a management console provider (114) is any hardware (e.g., circuitry), software, firmware, or any combination thereof that includes functionality to provide, at least in part, to an entity (e.g., an administrator), the ability to interface (e.g., via a command line), a data domain by providing instructions that cause actions to happen. For example, a management console provider (114) may be one or more processes executing on one or more processors of one or more computing devices (e.g., manager device (108)). In one or more embodiments, the management console provider (114) is operatively connected to one or more of the computing device manager (110), the display manager (112), and the alert manager (116) (discussed below).

In one or more embodiments, the manager device (108) includes an alert manager (116). In one or more embodiments, an alert manager (116) is any hardware (e.g., circuitry), software, firmware, or any combination thereof that includes functionality to provide, at least in part, alerts to an entity (e.g., an administrator) relating to events that occur within a data domain. For example, an alert manager (116) may be one or more processes executing on one or more processors of one or more computing devices (e.g., manager device (108)). In one or more embodiments, the alert manager (116) is operatively connected to one or more of the computing device manager (110), the display manager (112), and the management console provider (114).

While FIG. 1 shows a configuration of components, other configurations may be used without departing from the scope of embodiments described herein. Accordingly, embodiments disclosed herein should not be limited to the configuration of components shown in FIG. 1.

Figure 2:
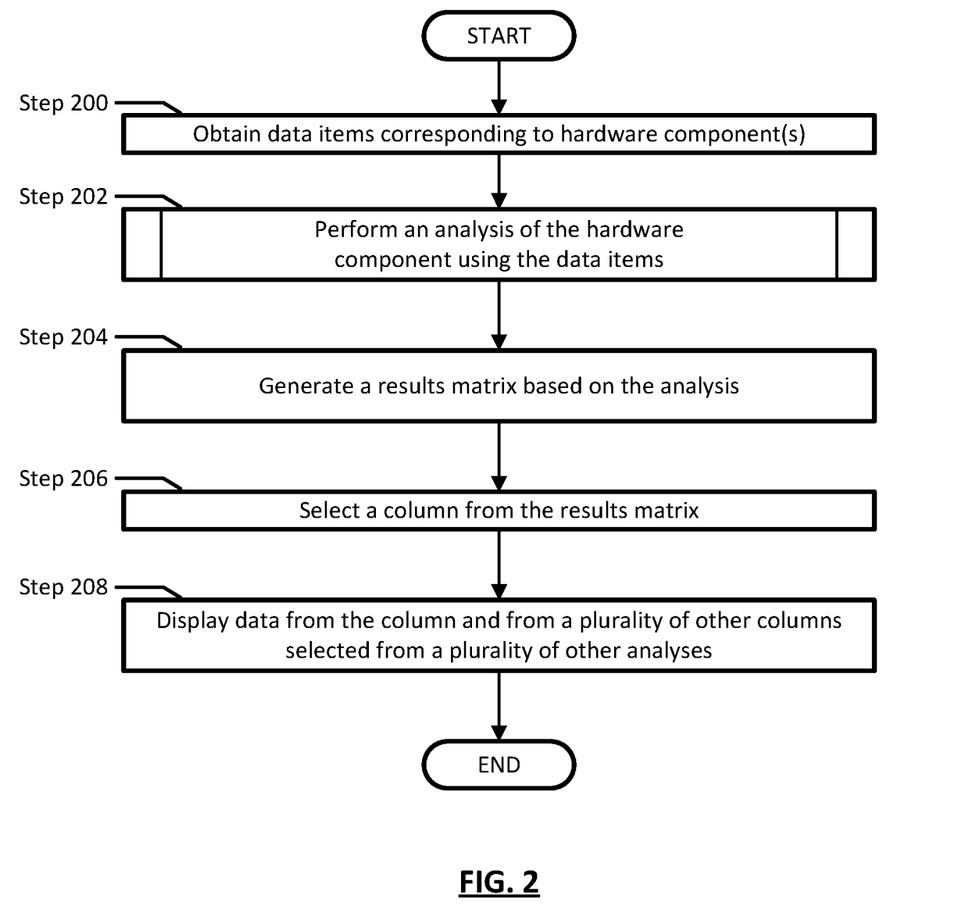
FIG. 2 shows a flowchart in accordance with one or more embodiments of the invention.

FIG. 2 shows a flowchart describing a method for probabilistically forecasting the state of hardware components in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, data items associated with a hardware component are obtained. In one or more embodiments, any number of sets of such data items may be obtained, each associated with a respective hardware component. In one or more embodiments, the data items are obtained by one or more analyzers from one or more computing devices of one or more data domains.

In Step 202, an analysis is performed using the data items obtained in step 200. In one or more embodiments, in addition to the data items, an analyzer also obtained predictions (e.g., using machine learning algorithm(s)) as to the state of the hardware components, which may be indicated using predicted assignment of labels to respective hardware components. In other embodiments, the analyzer performs the predictive analyses using the data items for each respective hardware component. In one or more embodiments, the analyses further include a probability prediction associated with each predicted label assignment. Additional details of the additional analysis are discussed further in the description of FIG. 3, below.

In Step 204, a results matrix is generated based on the results of the probability prediction analysis. In one or more embodiments, for a given hardware component, the results matrix includes the results of the probability prediction analysis. In one or more embodiments, the results matrix is an organized data structure that includes the possible label set for a given hardware component, with each possible label associated with a probability that it matches, in any sense, with a set of hardware components previously assigned the given label.

In Step 206, based on the results matrix, a column is selected that has the least numerical difference between the highest and the lowest value in the column. Such a column may represent the label that is probabilistically most likely to be correct for the hardware component. In one or more embodiments, there is a certain label from among the set of labels that is of possible interest to entities managing a data domain of computing devices having the hardware components. For example, if the label indicates that a hardware component is likely to fail within a defined time frame, that label may be the relevant label of interest. Accordingly, the set of columns selected from among all of the results matrices produced based on the analyses performed similar to that described in Step 202 may be the set of columns for which the relevant label is the label of interest (e.g., to fail within time frame).

In Step 208, the set of data from the columns selected in Step 206 is displayed. In one or more embodiments, a display manager of a manager device displays the results for consumption by an entity managing a data domain (e.g., an administrator). In one or more embodiments, the display includes a ranked listing of hardware components, and the associated probability range from the column selected in Step 206 for the hardware component. In one or more embodiments, as described above, the ranking will place the hardware component with the tightest range at the top of the list, and the remaining hardware devices in a descending manner thereafter. In one or more embodiments, the displayed ranking will only include a subset of the hardware components of a particular type. For example, the display may include a ranking of the top ten HDDs predicted to fail within seven days based on the tightness of the probability range from the column selected in Step 206.

After Step 208, the process may end.

Figure 3:
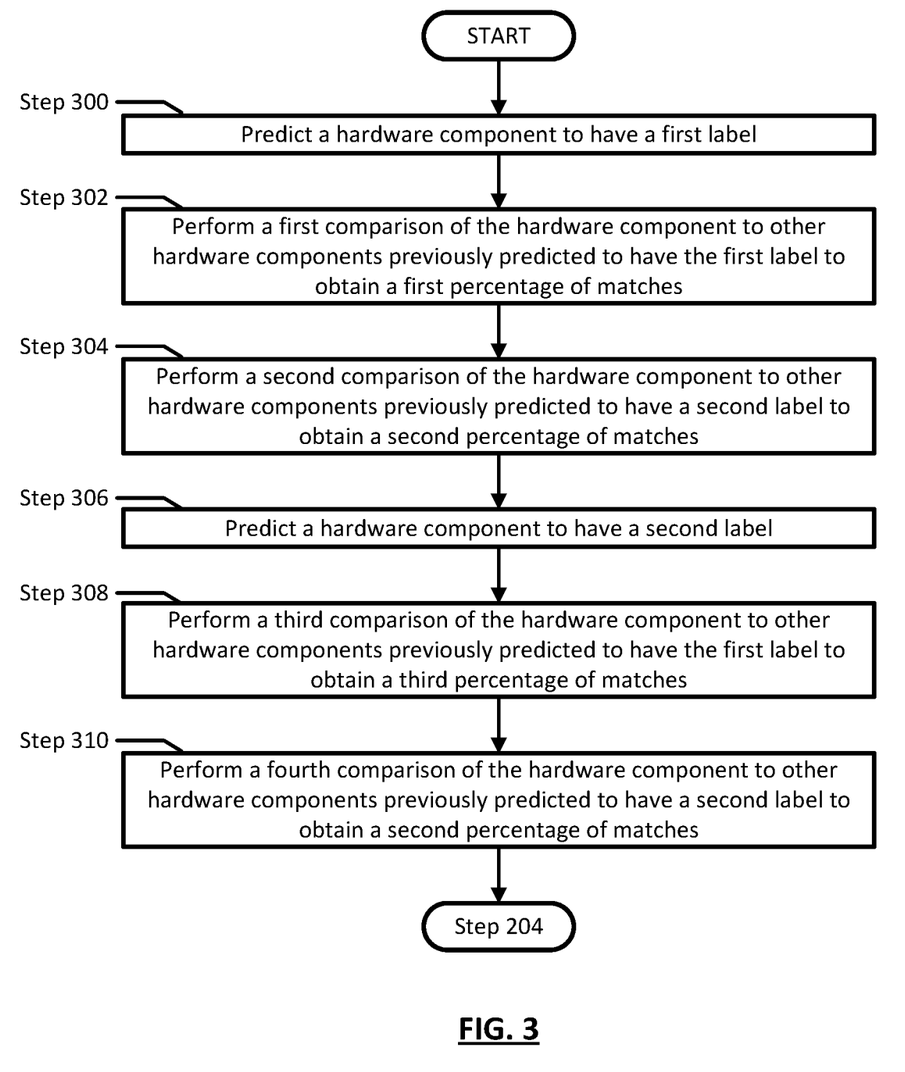
FIG. 3 shows a flowchart in accordance with one or more embodiments of the invention.

FIG. 3 shows a flowchart describing a method for probabilistically forecasting the state of hardware components in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, a prediction is made that a given hardware component should be assigned a first label (e.g., failed or soon to fail).

In Step 302, the prediction made in Step 300 is tested, at least in part. In one or more embodiments, the portion of the test of the prediction made in Step 300 includes comparing the prediction to a set of hardware components of the same type that were previously predicted to have the predicted label. For example, a nearest neighbor analysis may be performed that calculates that fraction of examples in the set of previously predicted hardware components to which the currently-being-analyzed hardware component would be considered a nearest neighbor. In one or more embodiments, the analysis includes creating a taxonomy used to group examples that are sufficiently similar (e.g., using the aforementioned nearest neighbor algorithm) In one or more embodiments, the results of the comparison yield a first probability representing the level of match between the current prediction and the set of hardware components of the same type that were previously predicted to have the predicted label.

In Step 304, the prediction made in Step 300 is tested again, at least in part. In one or more embodiments, the additional portion of the test of the prediction made in Step 300 includes comparing the prediction to a set of hardware components of the same type that were previously predicted to have a label different from the predicted label (e.g., normal instead of the predicted failed or soon to be failed label). For example, a nearest neighbor analysis may be performed that calculates that fraction of examples in the set of previously predicted hardware components to which the currently-being-analyzed hardware component would be considered a nearest neighbor. In one or more embodiments, the analysis includes creating a taxonomy used to group examples that are sufficiently similar (e.g., using the aforementioned nearest neighbor algorithm) In one or more embodiments, the results of the comparison yield a second probability representing the level of match between the current prediction and the set of hardware components of the same type that were previously predicted to have a label other than the predicted label.

In Step 306, a prediction is made that a given hardware component should be assigned a second label that is different from the first label (e.g., normal instead of failed).

In Step 308, the prediction made in Step 306 is tested, at least in part. In one or more embodiments, the portion of the test of the prediction made in Step 306 includes comparing the prediction to a set of hardware components of the same type that were previously predicted to have a label other than the predicted label (e.g., the predicted label is normal, and the comparison is to hardware components predicted to have a failed label). For example, a nearest neighbor analysis may be performed that calculates that fraction of examples in the set of previously predicted hardware components to which the currently-being-analyzed hardware component would be considered a nearest neighbor. In one or more embodiments, the analysis includes creating a taxonomy used to group examples that are sufficiently similar (e.g., using the aforementioned nearest neighbor algorithm) In one or more embodiments, the results of the comparison yield a third probability representing the level of match between the current prediction and the set of hardware components of the same type that were previously predicted to have the label that is different than the predicted label of Step 306.

In Step 310, the prediction made in Step 306 is tested again, at least in part. In one or more embodiments, the additional portion of the test of the prediction made in Step 306 includes comparing the prediction to a set of hardware components of the same type that were previously predicted to have the predicted label of Step 306. For example, a nearest neighbor analysis may be performed that calculates that fraction of examples in the set of previously predicted hardware components to which the currently-being-analyzed hardware component would be considered a nearest neighbor. In one or more embodiments, the analysis includes creating a taxonomy used to group examples that are sufficiently similar (e.g., using the aforementioned nearest neighbor algorithm) In one or more embodiments, the results of the comparison yield a fourth probability representing the level of match between the current prediction and the set of hardware components of the same type that were previously predicted to have the predicted label.

In one or more embodiments, after Step 310, the process returns to Step 204 of FIG. 2.

In one or more embodiments, the additional analysis set forth in FIG. 2 and FIG. 3, as discussed above, is used to determine a set of probabilities, and may be referred to as a probability analysis. One example of such a probability analysis is a Venn-Aber prediction framework. Other probability classification schemes may be used without departing from the scope of embodiments described herein. In one or more embodiments, the probability analysis makes separate predictions that a given hardware component should be assigned each label in a label set (e.g., predict failed, then predict normal). Next, for each prediction, the information associated with the hardware components is compared with the set of previously predicted hardware component labels.

For example, a label of failed for a hardware component is predicted out of a set of labels including failed and normal. Next, the prediction is compared with a set of hardware components of the same type previously predicted to be failed, and a probability is assigned based on the comparison. Next, the prediction is compared to the set of hardware component predictions previously made that the label should be normal, and a probability is assigned based on the comparison. Next, a label of normal is predicted out of a set of labels including failed and normal. Next, the prediction is compared with a set of hardware components of the same type previously predicted to be failed, and a probability is assigned based on the comparison. Next, the prediction is compared to the set of hardware component predictions previously made that the label should be normal, and a probability is assigned based on the comparison. In one or more embodiments, the four probabilities are arranged in a matrix that includes a column for each predicted label (e.g., failed, normal), and the probability results are used to populate the rows.

Next, each column (e.g., each predicted label) is assessed to determine the numerical difference between the highest and lowest value therein. In one or more embodiments, the column having the smallest numerical difference value represents the more likely correct label. In one or more embodiments, this type analysis is repeated for any number of hardware components of a given type (e.g., SSD, HDD, etc.) in, for example, a data center.

Figure 4:
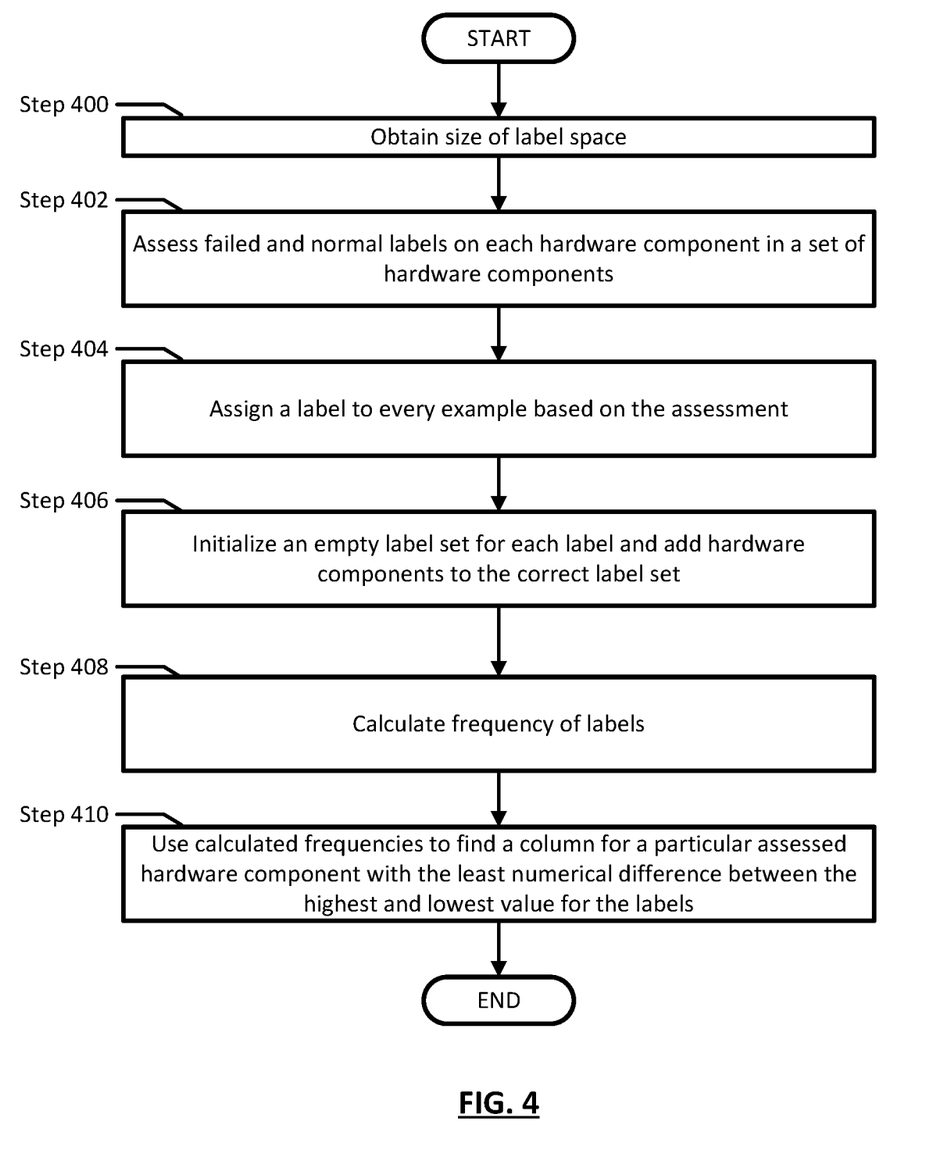
FIG. 4 shows a flowchart in accordance with one or more embodiments of the invention.

FIG. 4 shows a flowchart describing a method for probabilistically forecasting the state of hardware components in accordance with one or more embodiments disclosed herein. In one or more embodiments, the method shown in FIG. 4 expands the methods shown in FIG. 2 and FIG. 3 to any size set of hardware components in a data domain of devices having such hardware components.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 400, a size of a label space is obtained. In one or more embodiments, the size of the label space is the quantity of hardware components of a given type within a data domain that are to be analyzed.

In Step 402, each hardware component is assigned a failed label and also a normal label, representing an assignment to each hardware component each label in a label set that includes a failed label and a normal label.

In Step 404, one of the labels is assigned to a hardware components based on the assessment. In Step 406, an empty label set is initialized for each possible label, and hardware components assigned to the labels are added to the appropriate label set.

In Step 408, as frequency of the labels is calculated for each label set. In one or more embodiments, the frequency is a quantity of occurrences of a label.

In Step 410, the label frequencies calculated in Step 408 are used to find a column within the results matrix that has the least numerical difference between the highest and lowest probability values assigned to the possible labels. In one or more embodiments, the column found is then provided to a display manager of a manager device to be displayed to a user.

Figure 5:
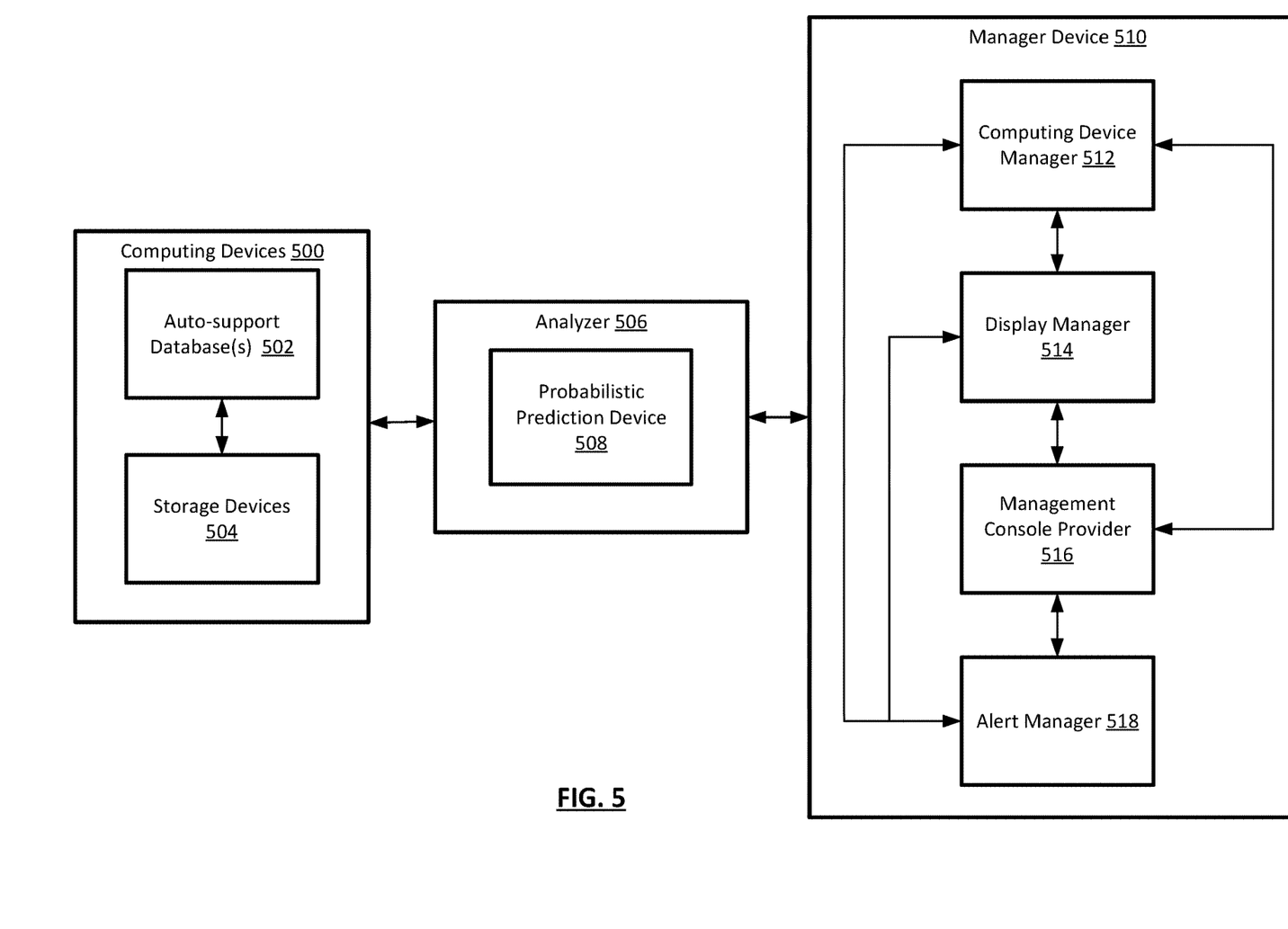
FIG. 5 shows an example in accordance with one or more embodiments of the invention.

FIG. 5 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 5, consider a scenario in which a set of computing devices (500) within a data domain have storage devices (e.g., SSDs and HDDs) (504) and an auto-support database (502) that includes a variety of data items associate with the storage devices (504) for each computing device. In such a scenario, each computing device of the computing devices (500) is operatively connected to an analyzer (506), which includes a probabilistic prediction device (508). Also, the analyzer (506) is operatively connected to a manager device (510). The manager device (510) includes a computing device manager (512), a display manager (514), a management console provider (516), and an alert manager (518).

In the aforementioned scenario, the analyzer periodically obtains data items associated with the various storage devices from the auto-support databases of the various computing devices that include the storage devices. In one or more embodiments, using the obtained data items, the analyzer (506) makes a prediction that a portion of the storage devices will fail within the next five days.

Next, the analyzer (506) performs a probabilistic prediction on the accuracy of the prediction using the probabilistic prediction device (508). To perform the probabilistic prediction, the probabilistic prediction device (508) performs a series of steps of a probability analysis.

In one or more embodiments, the probability analysis makes separate predictions for each storage device (504) that they should be assigned each label in a label set (e.g., predict failed, then predict normal). Next, for each prediction, the information associated with the storage devices (504) is compared with the set of previously predicted labels for storage devices.

For example, a label of failed for a storage device is predicted out of a set of labels including failed and normal. Next, the prediction is compared with a set of storage devices of the same type previously predicted to be failed, and a probability is assigned based on the comparison. Next, the prediction is compared to the set of storage device predictions previously made that the label should be normal, and a probability is assigned based on the comparison. Next, a label of normal is predicted out of a set of labels including failed and normal. Next, the prediction is compared with a set of storage devices of the same type previously predicted to be failed, and a probability is assigned based on the comparison. Next, the prediction is compared to the set of storage devices predictions previously made that the label should be normal, and a probability is assigned based on the comparison. In one or more embodiments, the four probabilities are arranged in a matrix that includes a column for each predicted label (e.g., failed, normal), and the probability results are used to populate the rows.

Next, each column (e.g., each predicted label) is assessed to determine the numerical difference between the highest and lowest value therein. In one or more embodiments, the column having the smallest numerical difference value represents the more likely correct label. In one or more embodiments, this type analysis is repeated for any number of storage devices (504) in a data center.

In one or more embodiments, once a set of data on storage devices (504) is created with the likely correct labels, the aggregate set can be assessed to determine a ranking of the hardware components to determine which has the highest probability of failure from among the set of hardware components of a given type. For example, a set of SSDs so analyzed may be ranked, in order of the tightness of the probability range for the label selected during the aforementioned analysis.

In one or more embodiments, once the ranking has occurred, the results may be displayed or otherwise provided to an entity that can take appropriate action(s) using the information. For example, the top ten most likely SSDs to fail in the next five days (based on the tightness of the probability distribution of the accuracy of the predicted label) may be displayed for viewing by an administrator of the data center. Such a display may allow the administrator to make improved decisions regarding which SSDs to replace, and/or when, based on the displayed listing that includes the probability ranges.

Figure 6:
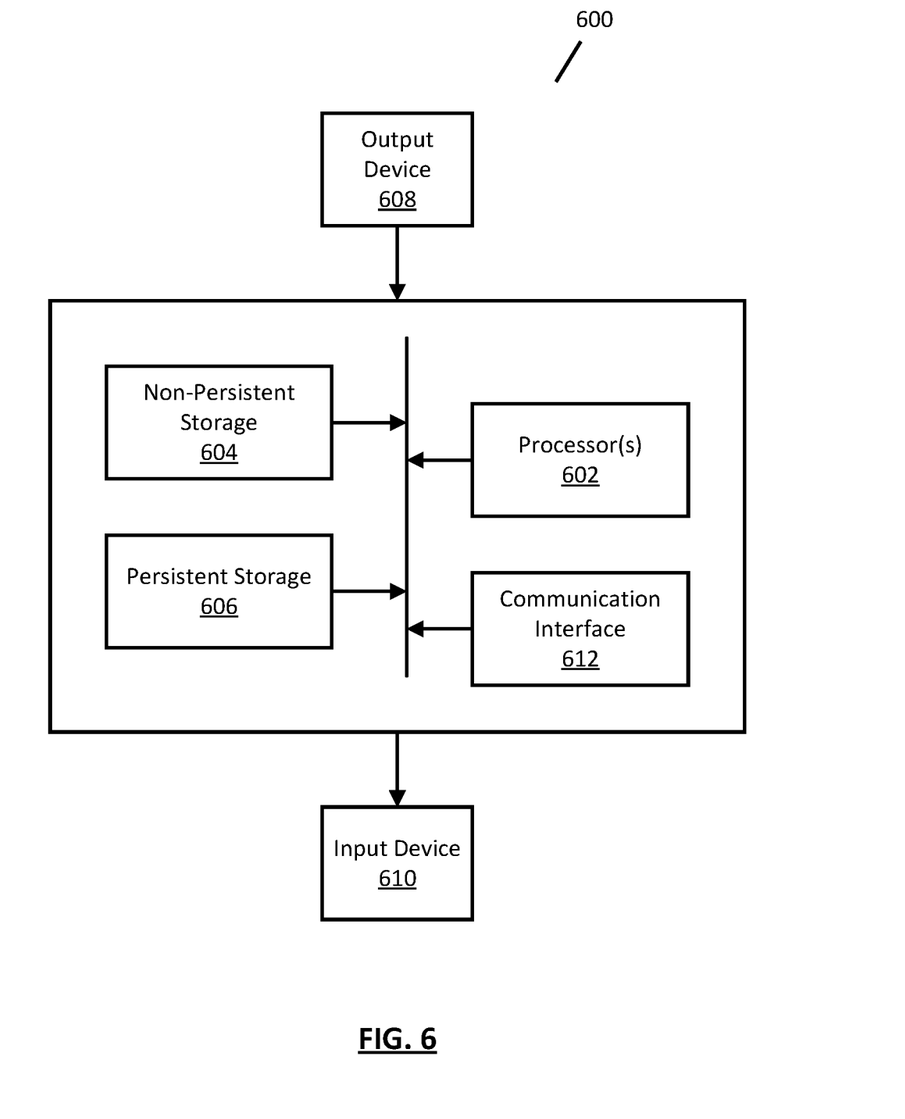
FIG. 6 shows a computing system in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (508), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (500) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed above should be understood as being examples of problems solved by embodiments of the invention of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for probabilistically forecasting a state of hardware components, the method comprising:
    obtaining a plurality of data items corresponding to a hardware component;
    performing an analysis to determine a hardware failure of the hardware component, wherein the analysis comprises:
        making a first prediction that the hardware component should be associated with a first label, wherein the first label indicates that the hardware component is predicted to be in a failed state;
        performing, based on the first prediction and using the plurality of data items and the first label, a first comparison of the hardware component to a plurality of other hardware components previously predicted to have the first label to obtain a first percentage of matches;
        performing, based on the first prediction and using the plurality of data items and the first label, a second comparison of the hardware component to a second plurality of other hardware components previously predicted to have a second label to obtain a second percentage of matches;
        making a second prediction that the hardware component should be associated with a second label, wherein the second label indicates that the hardware component is predicted to be in a normal state;
        performing, based on the second prediction and using the plurality of data items and the second label, a third comparison of the hardware component to the plurality of other hardware components previously predicted to have the first label to obtain a third percentage of matches; and
        performing, based on the second prediction and using the plurality of data items and the second label, a fourth comparison of the hardware component to the second plurality of other hardware components previously predicted to have the second label to obtain a fourth percentage of matches;
    generating a results matrix based on the first percentage of matches, the second percentage of matches, the third percentage of matches, and the fourth percentage of matches, wherein the results matrix represents a prediction of whether the hardware component is likely to be in a failed state within a timeframe;
    displaying on a display the results matrix; and
    replacing the hardware component based on the analysis.

2. The method of claim 1, further comprising performing an analysis on the results matrix to make a determination of which column of the results matrix is used in the display presented to a user.

3. The method of claim 2, wherein the determination is based on the first percentage of matches and the second percentage matches being numerically closer to one another than the third percentage of matches and the fourth percentage of matches.

4. The method of claim 2, wherein the display further comprises a plurality of other columns selected using a plurality of other results matrix analyses.

5. The method of claim 1, wherein the hardware component is a storage component.

6. The method of claim 5, wherein the plurality of data items comprises at least one selected from a group consisting of read errors, seek errors, power cycle data, reallocation event data, temperature data, and cyclic redundancy check error data.

7. The method of claim 1, wherein the hardware component is one selected from a group consisting of a processor, a battery, and a network component.

8. The method of claim 1, further comprising:
    calculating an accuracy score for an analysis of whether the hardware component is failed or normal; and
    making a determination, based on the accuracy score, that the analysis meets an accuracy threshold.

9. A non-transitory computer readable medium comprising computer readable program code, which when executed by a computer processor enables the computer processor to perform a method for probabilistically forecasting a state of hardware components, the method comprising:
    obtaining a plurality of data items corresponding to a hardware component;
    performing an analysis to determine a hardware failure of the hardware component, wherein the analysis comprises:
        making a first prediction that the hardware component should be associated with a first label, wherein the first label indicates that the hardware component is predicted to be in a failed state;
        performing, based on the first prediction and using the plurality of data items and the first label, a first comparison of the hardware component to a plurality of other hardware components previously predicted to have the first label to obtain a first percentage of matches;

performing, based on the first prediction and using the plurality of data items and the first label, a second comparison of the hardware component to a second plurality of other hardware components previously predicted to have a second label to obtain a second percentage of matches;

making a second prediction that the hardware component should be associated with a second label, wherein the second label indicates that the hardware component is predicted to be in a normal state;

performing, based on the second prediction and using the plurality of data items and the second label, a third comparison of the hardware component to the plurality of other hardware components previously predicted to have the first label to obtain a third percentage of matches; and performing, based on the second prediction and using the plurality of data items and the second label, a fourth comparison of the hardware component to the second plurality of other hardware components previously predicted to have the second label to obtain a fourth percentage of matches;

generating a results matrix based on the first percentage of matches, the second percentage of matches, the third percentage of matches, and the fourth percentage of matches, wherein the results matrix represents a prediction of whether the hardware component is likely to be in a failed state within a timeframe;

displaying on a display the results matrix; and replacing the hardware component based on the analysis.

10. The non-transitory computer readable medium of claim 9, wherein execution of the computer readable program code further comprises performing an analysis on the results matrix to make a determination of which column of the results matrix is used in the display presented to a user.

11. The non-transitory computer readable of claim 10, wherein the determination is based on the first percentage of matches and the second percentage matches being numerically closer to one another than the third percentage of matches and the fourth percentage of matches.

12. The non-transitory computer readable of claim 10, wherein the display further comprises a plurality of other columns selected using a plurality of other results matrix analyses.

13. The non-transitory computer readable medium of claim 9, wherein the hardware component is a storage component.

14. The non-transitory computer readable medium of claim 13, wherein the plurality of data items comprises at least one selected from a group consisting of read errors, seek errors, power cycle data, reallocation event data, temperature data, and cyclic redundancy check error data.

15. The non-transitory computer readable medium of claim 9, wherein the hardware component is one selected from a group consisting of a processor, a battery, and a network component.

16. The non-transitory computer readable medium of claim 9, wherein execution of the computer readable program code further comprises:
calculating an accuracy score for an analysis of whether the hardware component is failed or normal; and
making a determination, based on the accuracy score, that the analysis meets an accuracy threshold.

* * * * *